US009626585B2

(12) United States Patent
Zhou et al.

(10) Patent No.: US 9,626,585 B2
(45) Date of Patent: Apr. 18, 2017

(54) COMPOSITION MODELING FOR PHOTO RETRIEVAL THROUGH GEOMETRIC IMAGE SEGMENTATION

(71) Applicant: The Penn State Research Foundation, University Park, PA (US)

(72) Inventors: Zihan Zhou, State College, PA (US); Siqiong He, Mountain View, CA (US); Jia Li, State College, PA (US); James Z. Wang, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 14/705,252

(22) Filed: May 6, 2015

(65) Prior Publication Data

US 2015/0332117 A1 Nov. 19, 2015

Related U.S. Application Data

(60) Provisional application No. 61/992,408, filed on May 13, 2014.

(51) Int. Cl.
*G06K 9/52* (2006.01)
*G06K 9/20* (2006.01)
(Continued)

(52) U.S. Cl.
CPC ......... *G06K 9/468* (2013.01); *G06K 9/00624* (2013.01); *G06K 9/209* (2013.01); *G06K 9/32* (2013.01); *G06K 9/3208* (2013.01); *G06K 9/52* (2013.01); *G06T 5/003* (2013.01); *G06T 5/008* (2013.01); *G06T 5/20* (2013.01); *G06T 7/004* (2013.01); *G06T 7/0051* (2013.01); *G06T 7/0081* (2013.01); *G06K 2009/2045* (2013.01);
(Continued)

(58) Field of Classification Search
CPC ...... G06K 9/00624; G06K 9/209; G06K 9/32; G06K 9/3208; G06K 9/52; G06T 5/003; G06T 5/008; G06T 5/20; G06T 7/004; G06T 7/0051; G06T 7/0081
See application file for complete search history.

(56) References Cited

U.S. PATENT DOCUMENTS

| | | | |
|---|---|---|---|
| 2013/0002816 A1* | 1/2013 | Hannuksela | G06T 9/00 348/43 |
| 2014/0212027 A1* | 7/2014 | Hallquist | G06F 3/1415 382/154 |

(Continued)

OTHER PUBLICATIONS

Arbelaez, P. et al., Contour detection and hierarchical image segmentation, 33: 898-916, 2011.

(Continued)

*Primary Examiner* — David F Dunphy
(74) *Attorney, Agent, or Firm* — Dinsmore & Shohl LLP

(57) ABSTRACT

A composition model is developed based on the image segmentation and the vanishing point of the scene. By integrating both photometric and geometric cues, better segmentation is provided. These cues are directly used to detect the dominant vanishing point in an image without extracting any line segments. Based on the composition model, a novel image retrieval system is developed which can retrieve images with similar compositions as the query image from a collection of images and provide feedback to photographers.

23 Claims, 7 Drawing Sheets

(51) Int. Cl.
| | |
|---|---|
| *G06T 5/00* | (2006.01) |
| *G06T 7/00* | (2006.01) |
| *G06T 5/20* | (2006.01) |
| *G06K 9/00* | (2006.01) |
| *G06K 9/32* | (2006.01) |
| *G06K 9/46* | (2006.01) |

(52) U.S. Cl.
CPC .. *G06K 2009/3291* (2013.01); *G06T 2200/04* (2013.01); *G06T 2207/10004* (2013.01); *G06T 2207/10024* (2013.01); *G06T 2207/10028* (2013.01); *G06T 2207/20012* (2013.01); *G06T 2207/20064* (2013.01); *G06T 2207/20141* (2013.01); *G06T 2207/20192* (2013.01)

(56) References Cited

U.S. PATENT DOCUMENTS

2015/0063684 A1\* 3/2015 Taylor .................. G06T 7/0061
 382/154
2015/0199573 A1\* 7/2015 Rane ................ G06F 17/30247
 382/168

OTHER PUBLICATIONS

Barinova, O. et al., Fast automatic single-view 3-D reconstruction of urban scenes, *ECCV* (2), pp. 100-113, 2008.
Bhattacharya, S. et al., A framework for photo-quality assessment and enhancement based on visual aesthetics, *ACM Multimedia*, pp. 271-280, 2010.
Hoiem, D. et al., Recovering surface layout from an image, *International Journal of Computer Vision*, 75(1): 151-172, 2007.
Kong, H. et al., Vanishing point detection for road detection, *CVPR*, pp. 96-103, 2009.
Kosecka', J. et al., Video compass, *ECCV* (4), pp. 476-490, 2002.
Lee, D. et al., Geometric reasoning for single image structure recovery, *CVPR*, pp. 2136-2143, 2009.
Liu, L. et al., Optimizing photo composition, *Comput. Graph. Forum*, 29(2): 469-478, 2010.
Obrador, P. et al., The Role of Image Composition in Image Aesthetics, Proceedings of 2010 IEEE 17th International Conference on Image Processing, Sep. 26-29, 2010.
Rasmussen, C., Grouping dominant orientations for ill-structured road following, *CVPR* (1), pp. 470-477, 2004.
Saxena, A., et al., Make3d: Learning 3d scene structure from a single still image, *IEEE Trans. Pattern Anal. Mach. Intell.*, 31(5): 824-840, 2009.
Yao, L. et al., Oscar: On-Site Composition and Aesthetics Feedback through Exemplars for Photographers, *International Journal of Computer Vision*, 96(3): 353-383, 2012.

\* cited by examiner

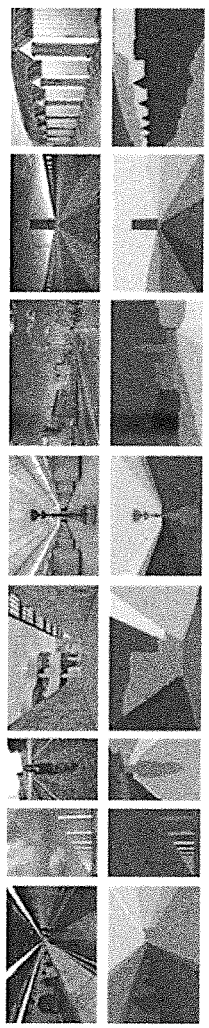
FIGURE 7A
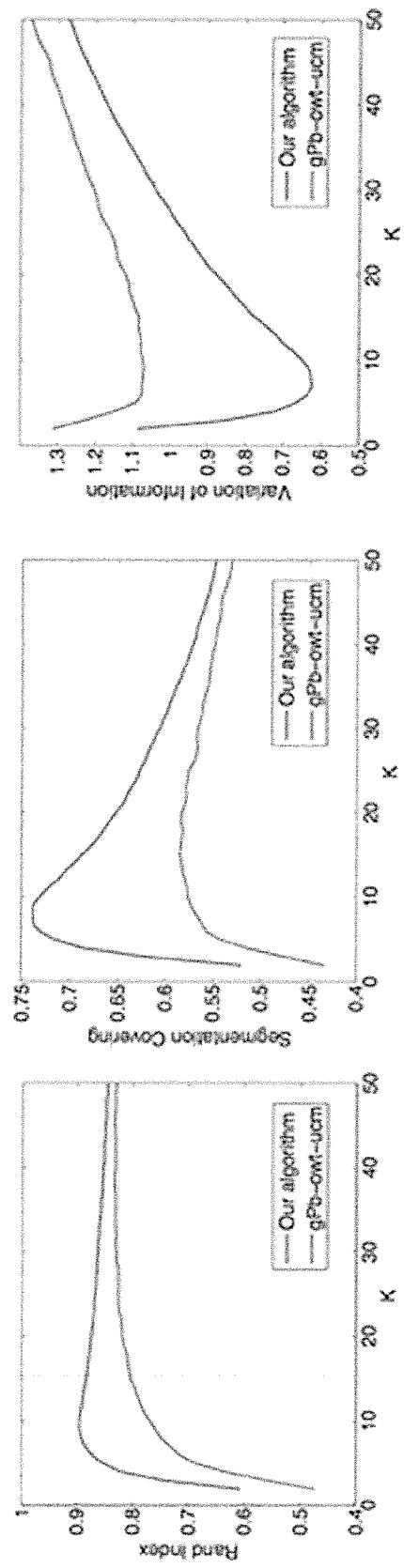
FIGURE 7D
FIGURE 7C
FIGURE 7B

COMPOSITION MODELING FOR PHOTO RETRIEVAL THROUGH GEOMETRIC IMAGE SEGMENTATION

REFERENCE TO RELATED APPLICATION

This application claims priority from U.S. Provisional Patent Application Ser. No. 61/992,408, filed May 13, 2014, the entire content of which is incorporated herein by reference.

FIELD OF THE INVENTION

This invention relates generally to photographic image analysis and, in particular, to the use of geometric image segmentation to model composition.

BACKGROUND OF THE INVENTION

With the rapid advancement of digital camera and mobile imaging technologies, we have witnessed a phenomenal increase of both professional and amateur photographs in the past decade. Large-scale social media companies, e.g., Flickr, Instagram, and Pinterest, further enable their users to share photos with people all around the world. As millions of new photos are added daily to the Internet, content-based image retrieval has kept high attention of the multimedia research community. Nevertheless, while most existing systems rely on low-levels features (e.g., color, texture, shape) or semantic information (e.g., object classes, attributes, events), similarity in visual composition has not been adequately exploited in retrieval [6, 17, 7, 36].

In photography, composition is the art of positioning or organization of objects and visual elements (e.g., color, texture, shape, tone, motion, depth) within an photo. Principles of organization include balance, contrast, Gestalt perception and unity, geometry, rhythm, perspective, illumination, and viewing path. Automated understanding of photo composition has been shown to benefit a number of applications such as summarization of photo collections [26] and assessment of image aesthetics [27]. It can also be used to render feedback to the photographer on the photo aesthetics [37] [36], and suggest improvements to the image composition through image retargeting [22] [4]. In the literature, most work on image composition understanding have focused on design rules such as the simplicity of the scene, visual balance, golden ratio, the rule of thirds, and the use of diagonal lines. These rules are mainly concerned with the 2D rendering of objects or the division of the image frame. They are by no means exhaustive for capturing the wide variations in photographic composition.

Standard composition rules such as the rule of thirds, golden ratio and low depth of field have played an important role in early works on image aesthetics assessment [5] [23]. Obrador et al. [27] later showed that by using only the composition features, one can achieve image aesthetic classification results that are comparable to the state-of-the-art. Recently, these rules have also been used to predict high-level attributes for image interestingness classification [8], recommend suitable positions and poses in the scene for portrait photography [37], and develop both automatic and interactive cropping and retargeting tools for image enhancement [22] [4]. In addition, Yao et al. [36] proposed a composition-sensitive image retrieval method which classifies images into horizontal, vertical, diagonal, textured, and centered categories, and uses the classification result to retrieve exemplar images that have similar composition and visual characteristics as the query image. However, as we mentioned before, these features or categories are all about 2D rendering, with 3D impression not taken into account.

Meanwhile, various methods have been proposed to extract 3D scene structures from a single image. The GIST descriptor [28] is among the first attempts to characterize the global arrangement of geometric structures using simple image features such as color, texture and gradients. Following this seminal work, a large number of supervised machine learning methods have been developed to infer approximate 3D structures or depth maps from the image using carefully designed models [15] [16] [10] [32] [25] or grammars [11] [12]. In addition, models tailored for specific scenarios have been studied, such as indoor scenes [20] [13] [14] and urban scenes [3]. However, these works all make strong assumptions on the structure of the scene, hence the types of scene they can handle in practice are limited. Despite the above efforts, obtaining a good estimation of perspective in an arbitrary image remains an open problem.

Typical vanishing point detection algorithms are based on clustering edges in the image according to their orientations. Kosecka and Zhang proposed an Expectation Maximization (EM) approach to iteratively estimate the vanishing points and update the membership of all edges [19]. Recently, a non-iterative method is developed to simultaneously detect multiple vanishing points in an image [34]. These methods assume that a large number of line segments are available for each cluster. To reduce the uncertainty in the detection results, a unified framework has been proposed to jointly optimize the detected line segments and vanishing points [35]. For images of scenes that lack clear line segments or boundaries, specifically the unstructured roads, texture orientation cues of all the pixels are aggregated to detect the vanishing points [30] [18]. But it is unclear how these methods can be extended to general images.

Image segmentation algorithms commonly operate on low-level image features such as color, edge, texture and the position of patches [33] [9] [21] [2] [24]. But it was shown in [31] that given an image, images sharing the same spatial composites can help with the unsupervised segmentation task.

SUMMARY OF THE INVENTION

In order to obtain a more comprehensive understanding of composition, it is necessary to examine the 3D structure of the scene and to use such insight sensibly in applications. A key observation is that during photographic creation photographers often make use of the linear perspective effects in the images to emphasize the sense of 3D space in a 2D photo. According to the perspective camera geometry, all parallel lines in 3D converge to a single point, the vanishing point, in the image. However, only the vanishing point which lies within or near the image frame and associates with the dominant structures of the scene (e.g., grounds, large walls, bridges) convey a strong impression of 3D space or depth to the viewers. FIGS. 1A-1C show some examples. We regard such a vanishing point as the dominant vanishing point of the particular image. By placing the dominant vanishing point at different image locations and choosing how each composition region in the image relates to this point, an experienced photographer could produce various image compositions that convey different messages or impressions to the viewers.

Therefore, to model the composition for such scenes, we partition an image into photometrically and geometrically consistent regions according to the dominant vanishing point. Each geometric region can be roughly modeled by a flat surface, or a plane. As shown in FIG. 1C, such a partition naturally provides us with a novel holistic yet compact representation of the 3D scene geometry that respects the perspective effects of the scene that the image is capturing, and allows us to derive a notion of relative depth and scale for the objects. Nevertheless, obtaining such a representation is a challenging problem for the following reasons.

First, given any two adjacent geometric regions in an image, there may not be a distinguishable boundary in terms of photometric cues (e.g., color, texture) so that they can be separated. For example, the walls and the ceiling in the second photo of FIG. 1A share the same building material. Because existing segmentation algorithms primarily depend on the photometric cues to determine the distance between regions, they are often unable to separate these regions from each other (see FIG. 1B for examples). To resolve this issue, we use a novel hierarchical image segmentation algorithm that leverages significant geometric information about the dominant vanishing point in the image. Specifically, we compute a geometric distance between any two adjacent regions based on the similarity of the angles of the two regions in a polar coordinate system, with the dominant vanishing point being the pole. By combining the geometric cues with conventional photometric cues, our method is able to preserve essential geometric regions in the image.

Second, detecting the dominant vanishing point from an image itself is a nontrivial task. Typical vanishing point detection methods assume the presence of a large number of strong edges in the image. However, for many photos of natural outdoor scenes, such as the image of an arbitrary road, there may not be adequate clearly-delineated edges that converge to the vanishing point. In such cases, the detected vanishing points are often unreliable and sensitive to image noise. To overcome this difficulty, we observe that while it may be hard to detect the local edges in these images, it is possible to directly infer the location of the vanishing point by aggregating the aforementioned photometric and geometric cues over the entire image (FIGS. 1A-1C and 6). Based on this observation, we develop a novel vanishing point detection method which does not rely on the existence of strong edges, hence works better for natural images.

Finally, because our region-based model captures rich information about the photo composition, we further develop a composition-sensitive image retrieval system and demonstrate its application in providing amateur users with on-site feedback about the composition of their photos, in the same spirit as Yao et al. [36]. In particular, given a query image taken by the user, the system retrieves exemplar photos with similar compositions from a collection of photos taken by experienced photographers. These exemplar photos can serve as an informative guide for the users to achieve good compositions in their photos.

In summary, we have made the following contributions:

Composition Modeling: We model the composition of an image by examining the perspective effects and partitioning the image into photometrically and geometrically consistent regions using our novel hierarchical image segmentation algorithm.

Dominant Vanishing Point Detection: By aggregating the photometric and geometric cues used in our segmentation algorithm, we develop an effective method to detect the dominant vanishing point in an arbitrary image.

Composition-Sensitive Image Retrieval: We apply our region-based model for image composition understanding to retrieve images with similar composition as the query image from a collection of images.

It is an object of this invention to provide a model and method of analyzing a photographic image. The model may be implemented on a computer processor capable of receiving an image and operative to perform the steps of determining a vanishing point in the image, providing an over-segmentation which generates regions and boundaries between two of the adjacent regions, defining a weight for a boundary between two of the adjacent regions as a function of the photometric and geometric cues between the two of the adjacent regions, executing a hierarchical image segmentation process on the image to obtain an image segmentation map that partitions the image into photometrically and geometrically consistent regions, modeling the composition of the image based upon the image segmentation map and the vanishing point. The regions are characterized by photometric and geometric cues.

The lower the weight at a boundary is, the more likely the two adjacent regions at the boundary belong to a same plane.

A photometric distance between any two of the adjacent regions may be used as a photometric cue. A geometric distance between any two of the adjacent regions may be used as a geometric cue.

The geometric distance between two of the adjacent regions is computed based on their relative locations with respect to the vanishing point in a polar coordinate system, with the vanishing point being the pole.

The hierarchical image segmentation process includes the steps of computing the weight at all of the boundaries, merging two of the adjacent regions if the weight at the boundary between the two of the adjacent regions is smaller than a threshold, and repeating the computing and merging steps until the desired number of regions is reached.

Determining a vanishing point in the image includes the steps of generating a grid mesh on the image, assuming each of the vertexes on the grid as an assumed vanishing point, aggregating the photometric and geometric cues over the entire image over-segmentation, and determining one of the assumed vanishing points as the vanishing point based upon the cues.

The step of aggregating the photometric and geometric cues over the entire image over-segmentation includes the step of calculating a consensus score as the sum of products of the photometric and geometric distances between all pairs of adjacent regions of the image over-segmentation.

While determining a vanishing point in the image, CPU time may be reduced by using a coarse-to-fine procedure.

The image segmentation map includes a plurality of segmented regions. Each of the segmented regions may be modeled as a flat surface or a plane. Each of the segmented regions may represent a different plane.

The method may also include storing in a memory a plurality of images with image composition previously determined by using the model and retrieving exemplar images having a similar composition to the image from the plurality of images in the memory.

The method uses a similarity measure to compare the composition of two images, and the similarity measure is computed based on the image segmentation maps and the vanishing points of the images.

The method may include using the retrieved exemplar images to provide feedback to a user about the composition of the image.

The method may include using the image composition of the image to enhance or adjust the image.

The method may include using the image composition of the image to create another image including an image collage, montage, or stitching.

The method may include using the image composition of the image to assist image-based applications including scene understanding, 3D reconstruction, robotics, autonomous vehicles, interior design, or landscape design.

It is another object of this invention to provide a system for analyzing a photographic image which includes an input for receiving an image, a computer processor operative to perform the steps of determining a vanishing point in the image, providing an over-segmentation of the image which generates regions and boundaries between two of the adjacent regions, wherein each of the regions is characterized by photometric and geometric cues, determining a weight for a boundary between two of the adjacent regions as a function of the photometric and geometric cues between the two of the adjacent regions, executing a hierarchical image segmentation process on the image to obtain an image segmentation map that partitions the image into photometrically and geometrically consistent regions and an output for outputting image composition quality information based on the image segmentation map and the vanishing point.

The system of analyzing a photographic image may further include a memory for storing a plurality of images with image composition previously determined using the model.

The computer processor may also perform retrieving exemplar images having a similar composition to the image from the plurality of images in the memory and providing feedback to a user about the composition of the image.

The computer processor may also be configured to perform the step of using the image composition of the image to enhance or adjust the image.

The computer processor may be configured to perform the step of using the image composition of the image to create another image including an image collage, montage, or stitching.

The computer processor may also be configured to perform the step of using the image composition of the image to assist image-based applications including scene understanding, 3D reconstruction, robotics, autonomous vehicles, interior design, or landscape design.

While we focus on the use of perspective geometry in the photography, we also point out that there are many works which study other important aspects of composition, including the semantic features (e.g., buildings, trees, roads) [15], [16], [10], [11]. It would be ideal to integrate all these features in order to gain a deeper understanding of the image composition, especially when there is a lack of strong perspectivity.

BRIEF DESCRIPTION OF THE DRAWINGS

FIG. 7A shows some example test images with the manually labeled segmentation maps;

FIG. 7B shows rand index;

FIG. 7C shows segmentation covering;

FIG. 7D shows variation of information; and.

DETAILED DESCRIPTION OF THE INVENTION

Overview of Hierarchical Image Segmentation

Since our segmentation method follows the classic hierarchical segmentation framework, we give an overview of the framework and some of the state-of-the-art results.

Generally speaking, the segmentation method can be considered as a greedy graph-based region merging algorithm. Given an over-segmentation of the image, we define a graph G=(R, E, W(E)), where each node corresponds to one region, and R={$R_1$, $R_2$, . . . } is the set of all nodes. Further, E={$e_{ij}$} is the set of all edges connecting adjacent regions, and the weights W(E) are a measure of dissimilarity between regions. The algorithm proceeds by sorting the edges by their weights and iteratively merging the most similar regions until certain stopping criterion is met. Each iteration consists of three steps:

1. Select the edge with minimum weight:

$$e^* = \arg\min_{e_{ij} \in E} W(e_{ij}).$$

2. Let $R_1, R_2 \in R$ be the regions linked by $e^*$. Set $R \leftarrow R \setminus \{R_1, R_2\} \cup \{R_{1 \cup 2}\}$ and update the edge set E accordingly.

3. Stop if the desired number of regions K is reached, or the minimum edge weight is above a threshold $\delta$. Otherwise, update weights W(E) and repeat.

Figures 1A, 1B, 1C:
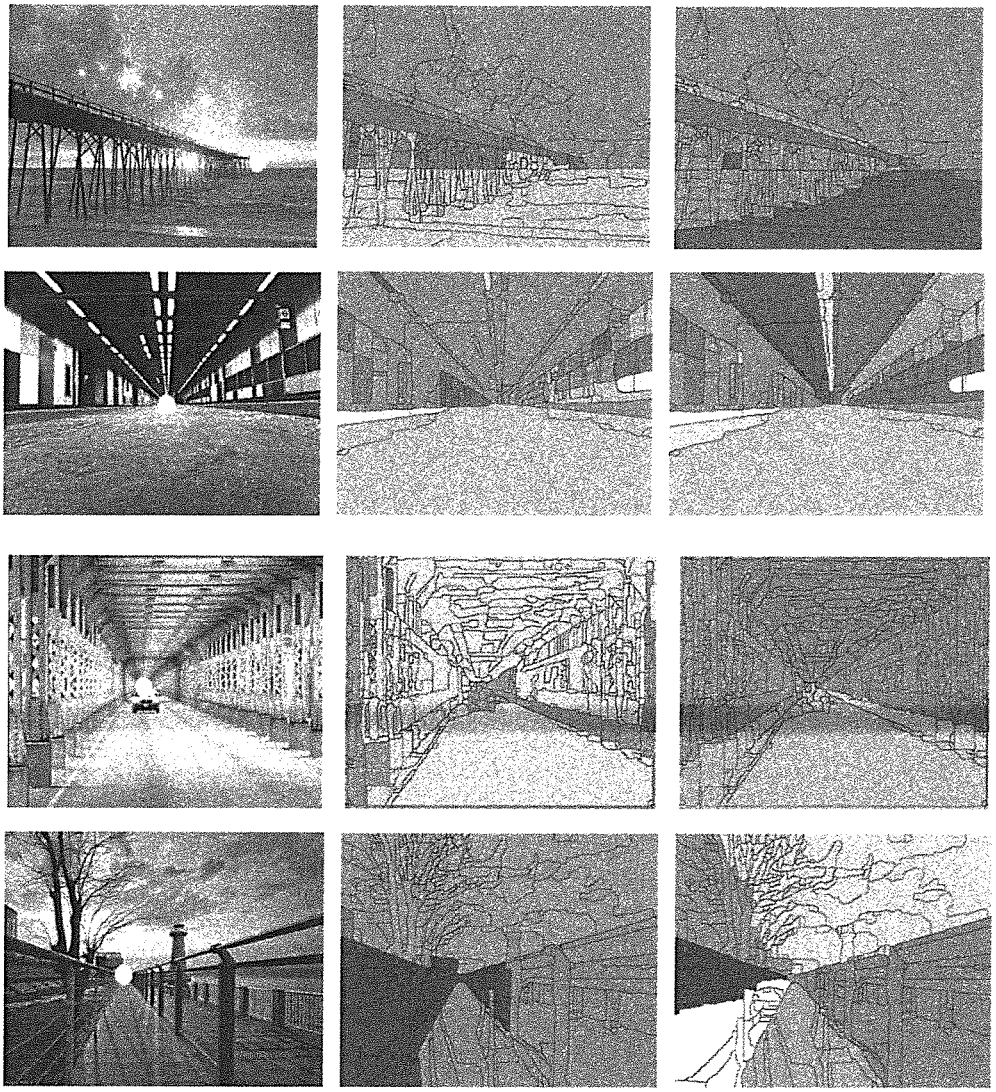
FIG. 1A shows geometric image segmentation of the original image with the dominant vanishing point detected by the method of the present invention, shown by a round dot.
FIG. 1B shows region segmentation map produced using a state-of-the-art method.
FIG. 1C shows region segmentation map produced by the method of the present invention.
Figure 2A:
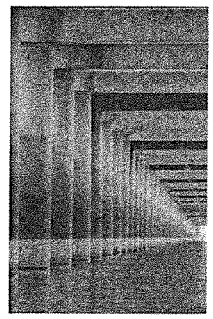
FIGS. 2A-2C illustrate image segmentation obtained via spectral clustering.
Figure 2B:
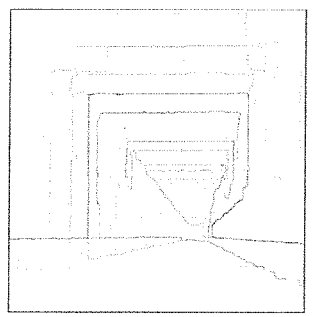
Figure 2C:
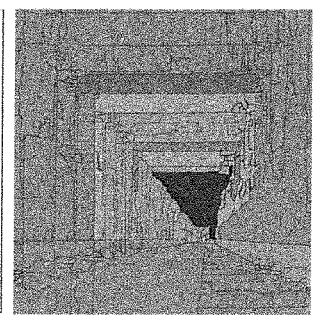

Various measures have been proposed to determine the distance between two regions, such as the difference between the intensity variance across the boundary and the variance within each region [9], and the difference in coding lengths [24]. Recently, Arbelaez et al. proposes a novel scheme for contour detection which integrates global photometric information into the grouping process via spectral clustering [2]. They have shown that this globalization scheme can help identify contours which are too weak to be detected using local cues. The detected contours are then converted into a set of initial regions (i.e., an over-segmentation) for hierarchical image segmentation. We show an example of the segmentation result obtained by [2] in FIGS. 2A-2C. In particular, in FIG. 2B, we visualize the entire hierarchy of regions on an real-valued image called the ultrametric contour map (UCM) [1], where each boundary is weighted by the dissimilarity level at which it disappears. In FIG. 2C, we further show the regions obtained by thresholding the UCM at a fixed scale. It is clear that because the weights of the boundaries are computed only based on the photometric cues in [2], different geometric regions often have weak boundaries and are therefore merged at early stages in the hierarchical segmentation process.

Motivated by this observation, we take the over-segmentation result generated by [2] (i.e., by thresholding the UCM at a small scale 0.05) as the input to our algorithm, and develop a new distance measure between regions which takes both photometric and geometric information into consideration.

Detailed Method

In this section, we first introduce our geometric distance measure for hierarchical image segmentation, assuming the location of the dominant vanishing point is known. The geometric cue is then combined with traditional photometric cues to obtain a holistic representation for composition modeling. Finally, we further show how the distance measure, when aggregated over the entire image, can be used to detect the dominant vanishing point in an image.

Geometric Distance Measure

We assume that a major portion of the scene can be approximated by a collection of 3D planes which are parallel to a dominant direction in the scene. The background, e.g., the sky, can be treated as a plane at infinity. The dominant direction is characterized by a set of parallel lines in the 3D space which, when projected to the image, converge to the dominant vanishing point. Consequently, given the location of the dominant vanishing point, our goal is to segment an image into several regions so that each region can be roughly modeled by one plane in the scene. To achieve this goal, we need to formulate a dissimilarity measure which takes small values if the pair of adjacent regions belong to the same plane, and large values otherwise.

We note that any two planes that are parallel to the dominant direction must intersect at a line which passes through the dominant vanishing point in the image. Intuitively, this observation provides us with a natural way to identify adjacent regions that could potentially lie on different planes: If the boundary between two regions is parallel to the dominant direction (hence passes through the dominant vanishing point), these two regions are likely to lie on different planes. However, in the real world, many objects are not completely planar, hence there may not be a clear straight line that passes through the dominant vanishing point between them. As an example, if we focus our attention on the three adjacent regions $R_1$, $R_2$ and $R_3$ in FIG. 3B, we notice that $R_1$ and $R_3$ belong to the vertical wall and $R_2$ belongs to the ceiling. However, the boundaries between the pair ($R_1$, $R_2$) and the pair ($R_1$, $R_3$) both lie on the same (vertical) line. As a result, it is impossible to differentiate these two pairs based on only the orientation of these boundaries.

Figure 3C:
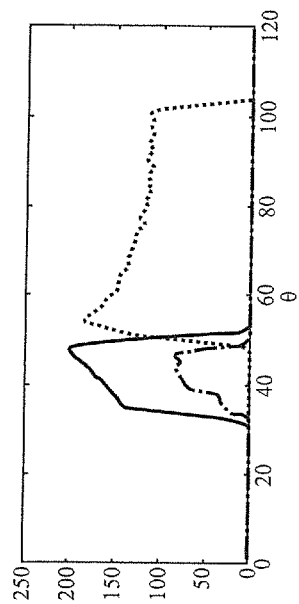
FIG. 3C shows the histograms of angle values for the three regions.

To tackle this problem, we propose to look at the angle of each region from the dominant vanishing point in a polar coordinate system, instead of the orientation of each boundary pixel. Here, the angle of a region is represented by the distribution of angles of all the pixels in this region. Mathematically, let the dominant vanishing point P be the pole of the polar coordinate system, for each region $R_i$, we compute the histogram of the angle value $\theta(X)$ for all the pixels $X \in R_i$, as illustrated in FIG. 3C.

Let $c_i(\theta)$ be the number of the pixels in $R_i$ that fall into the $\theta$-th bin. We say that one region $R_i$ dominates another region $R_j$ at angle $\theta$ if $c_i(\theta) \geq c_j(\theta)$. Our observation is that if one region $R_i$ always dominates another region $R_j$ at almost all angles, these two regions likely belong to the same plane. Meanwhile, if one region has larger number of pixels at some angles whereas the other region has larger number of pixels at some other angles, these two regions likely lie on different planes. This observation reflects the fact a plane converging to the vanishing point often divides along the direction perpendicular to the dominant direction because of architectural or natural structures, e.g., columns and trees. Because perpendicular separation of regions has little effect on the polar angles, the histograms of angles tend to overlap substantially.

Based on this observation, we define the geometric distance between any two regions $R_i$ and $R_j$ as follows:

$$W_g(e_{ij}) = 1 - \max\left(\frac{\sum_\theta \min(c_i(\theta), c_j(\theta))}{|R_i|}, \frac{\sum_\theta \min(c_i(\theta), c_j(\theta))}{|R_j|}\right),$$

where $|R_i|$ and $|R_j|$ are the total numbers of pixels in regions $R_i$ and $R_j$, respectively. For example, as illustrated in FIG. 3C, $R_1$ dominates $R_3$ at all angles and hence we have $W_g(e_{1,3})=0$. Meanwhile, $R_1$ and $R_2$ dominate each other at different angles and their distributions have very small overlap. As a result, their geometric distance is large: $W_g(e_{1,2})=0.95$.

Figure 3D:
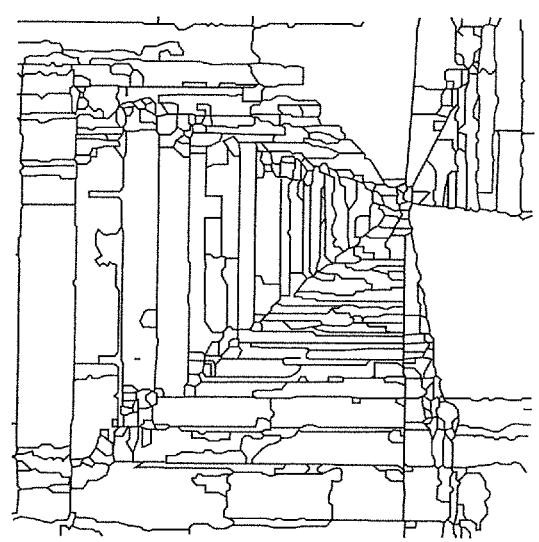
FIG. 3D shows the boundary map weighted by the geometric distance between adjacent regions.
Figure 3A:
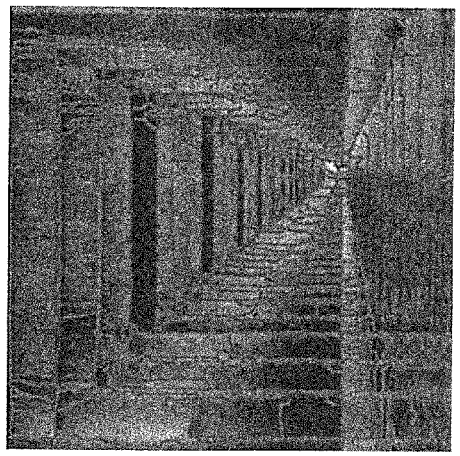
FIG. 3A illustrates the computation of the geometric distance, specifically the over-segmentation map with the polar coordinate system.
Figure 3B:
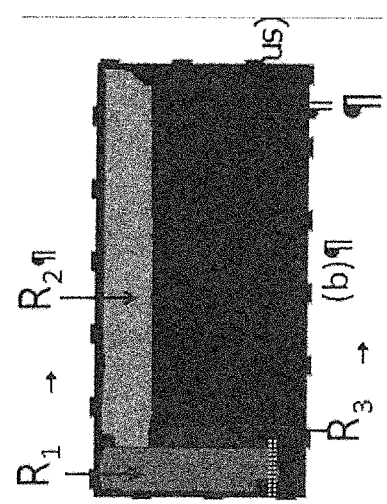
FIG. 3B shows three adjacent regions from the image.

In FIG. 3D, we show all the boundaries weighted by our geometric distance. As expected, the boundaries between two regions which lie on different planes tend to have higher weights than other ones. Here, it is worth noting that the weighted boundary map only reflects the distances between all adjacent regions at one stage of the hierarchical image segmentation process, whereas the UCM shown in FIGS. 2A-2C represents the entire hierarchy of regions obtained by the same process. By comparing the angle distributions of two adjacent regions, we can obtain a more robust estimate of the boundary orientations than directly examining the orientations of boundary pixels.

Combining Photometric and Geometric Cues

While our geometric distance measure is designed to separate different geometric structures, i.e., planes, in the scene, the traditional photometric cues often provide additional information about the composition of images. Because different geometric structures in the scene often have different colors or texture, the photometric boundaries often coincide with the geometric boundaries. On the other hand, in practice it may not always be possible to model all the structures in the scene by a set of planes that are parallel to the dominant direction. Recognizing the importance of such structures to the composition of the image due to their visual saliency, it is highly desirable to integrate the photometric and geometric cues in our segmentation framework to better model composition. In our work, we combine the two cues using a linear combination:

$$W(e_{ij}) = \lambda W_g(e_{ij}) + (1-\lambda) W_p(e_{ij}),$$

where $W_p(e_{ij})$ is the photometric distance between adjacent regions, and can be obtained from any conventional hierarchical image segmentation method. Here we adopt the contour map generated by [2].

Figure 4:
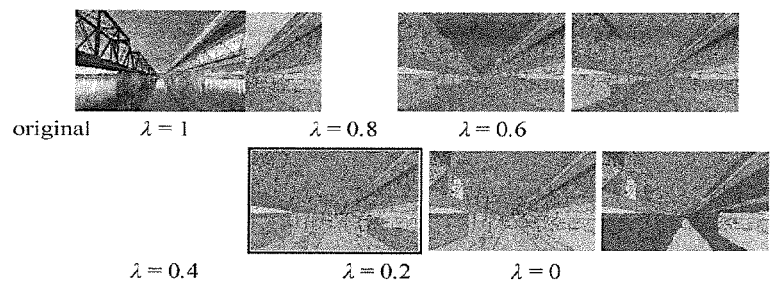
FIG. 4 shows the segmentation results of an image using different choices of $\lambda$ and a fixed number of regions K.
Figure 5:
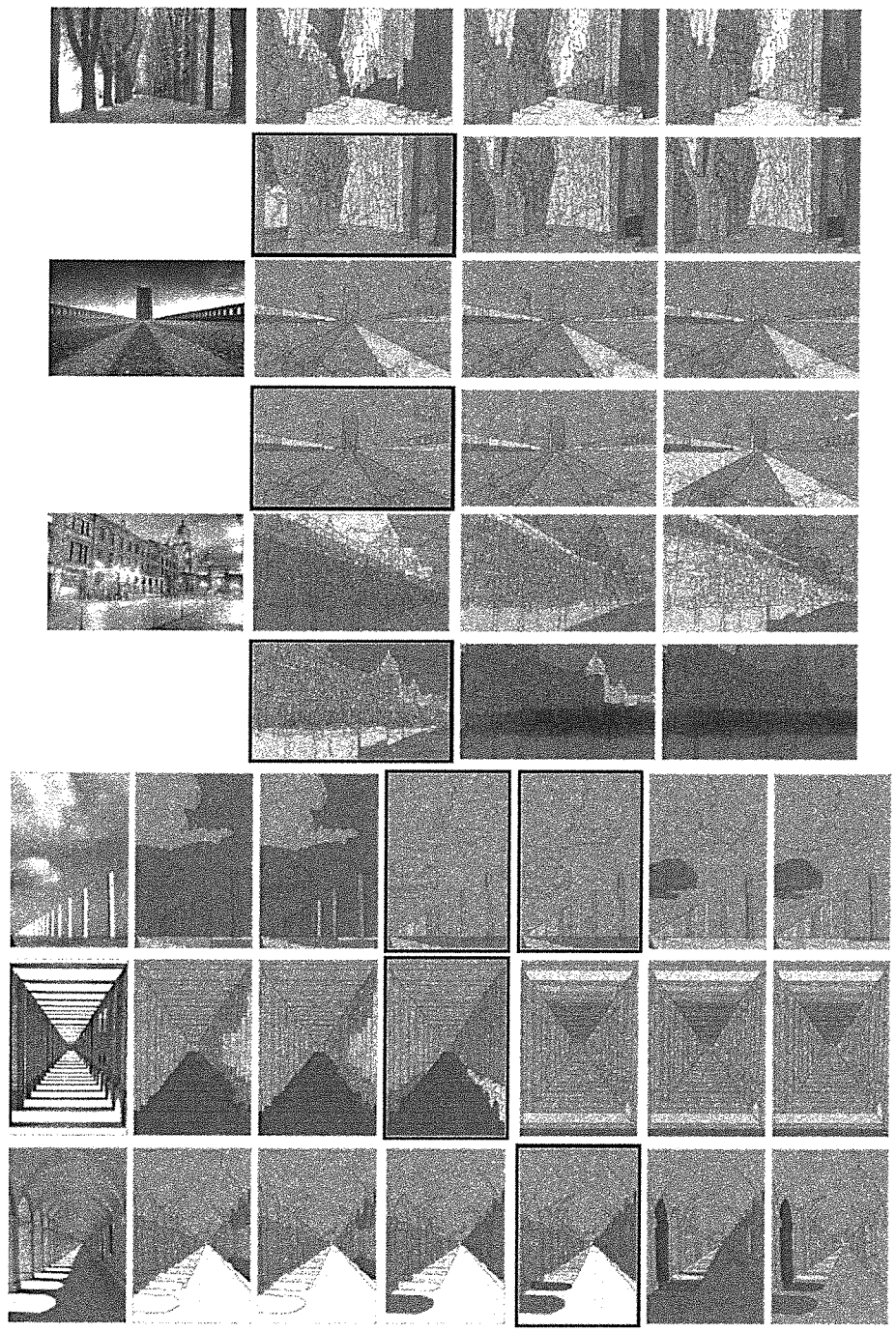
FIG. 5 provides examples of geometric image segmentation by integrating photometric and geometric cues.

In FIG. 4, we show the segmentation results of an image using our method with different choices of λ and a fixed number of regions K. Note that when λ=1, only the geometric cues are used for segmentation; when λ=0, the result is identical to that obtained by the conventional method [2]. It can be seen that using the geometric cues alone (λ=1), we are able to identify most of the structures in the scene. Some of the boundaries between them may not be accurate enough (e.g., the boundary between the bridge on the left and the sky area). However, when λ=0, the algorithm tends to merge regions from different structures early in the process if they have similar colors. By combining the two cues (e.g., λ is 0.4 or 0.6), we are able to eliminate the aforementioned problems and obtain satisfactory result. Additional results are provided in FIG. 5. Our method typically achieves the best performance when λ is in the range of [0.4, 0.6]. We fix λ to 0.6 for the remaining experiments.

Enhancing Vanishing Point Detection

In the previous subsection we demonstrated how the knowledge about the dominant vanishing point in the scene can considerably improve the segmentation results. However, detecting the vanishing point in an arbitrary image itself is a challenging problem. Most existing methods assume that (1) region boundaries in the image provide important photometric cues about the location of the dominant vanishing point, and (2) these cues can be well captured by a large number of line segments in the image. In practice, we notice that while the first assumption is generally true, the second one often fails to hold, especially for images of natural outdoor scenes. This is illustrated in FIGS. 6A-6E, although human can easily infer the location of the dominant vanishing point from the orientations of the aggregated region boundaries, existing line segment detection algorithms may fail to identify these boundaries. For this reason, any vanishing point detection method that relies on the detected line segments would also fail.

Figure 6A:
FIG. 6A depicts enhancing vanishing point detection of the original image.
Figure 6D:
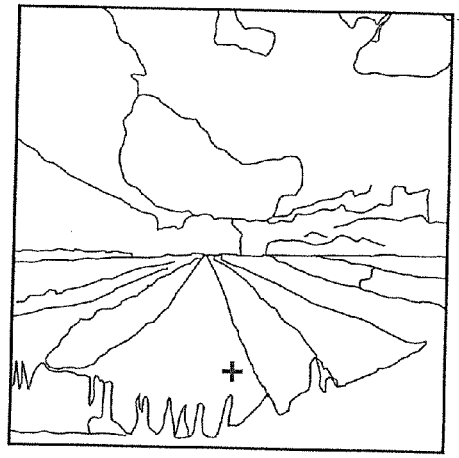
FIG. 6D shows the weighted boundary map for another hypothesis of the dominant vanishing point location.
Figure 6B:
FIG. 6B shows the line segment detection.
Figure 6E:
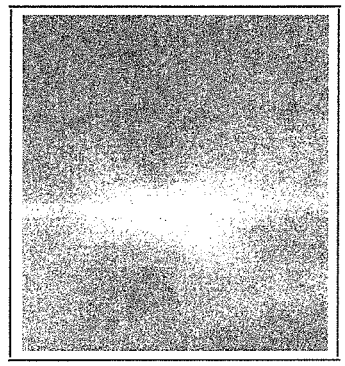
FIG. 6E shows the consensus score for all vertices on the grid.
Figure 6C:
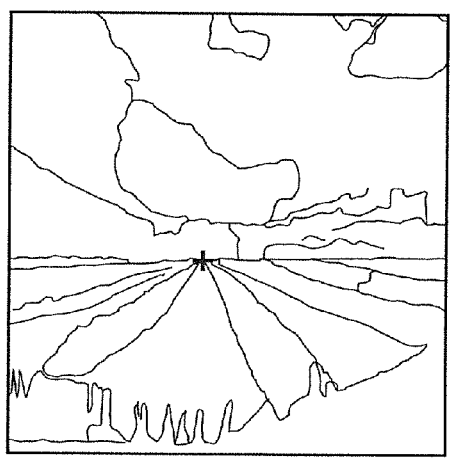
FIG. 6C shows the weighted boundary map for a hypothesis of the dominant vanishing point location.

To alleviate this issue, we use our geometric distance measure $W_g(e_{ij})$ to obtain a more robust estimation of the orientation of each boundary and subsequently develop a simple exhaustive search scheme to detect the dominant vanishing point. In particular, given a hypothesis of the dominant vanishing point location, we can obtain a set of boundaries which align well with the converging directions in the image by computing $W_g(e_{ij})$ for each pair of adjacent regions. These boundaries then form a "consensus set". We compute a score for the hypothesis by summing up the strengths of the boundaries in the consensus set (FIGS. 6C and 6D). Finally, we keep the hypothesis with the highest score as the location of the dominant vanishing point (FIG. 6E. Our algorithm can be summarized as follows:

1. Divide the image by an m×n uniform grid mesh.
2. For each vertex $P_k$ on the grid, we compute the geometric distance $W_g(e_{ij})$ for all the boundaries in an over-segmentation of the image. Then, the consensus score for $P_k$ is defined as:

$$f(P_k) = \sum_{e_{ij} \in E} W_p(e_{ij}) W_g(e_{ij}).$$

3. Select the point with the highest score as the detected dominant vanishing point: $P^* = \arg\max f(P_k)$.

Here, the size of the grid may be chosen based on the desired precision for the location of the vanishing point. In practice, our algorithm can find the optimal location in about one minute on a 50×33 grid on a single CPU. We also note that the time may be further reduced using a coarse-to-fine procedure.

Composition-Sensitive Image Retrieval

Based on the composition driven segmentation obtained by our method, we develop a novel system for composition-sensitive image retrieval. One practical application of the system is to provide on-site composition feedback through retrieved examples. Specifically, given a query photo taken by the user, our system can retrieve photos with similar compositions as the query photo in a collection of photos taken by experienced or accomplished photographers. The retrieved photos then serve as an informative guide for the users to improve their composition skills. Yao et al. pioneered this direction in [36], but the types of composition studied there are limited to a few categories which are pre-defined based on 2D rendering.

A completely different approach is taken to develop a similarity measure to compare the composition of two images based on their geometric image segmentation maps. Our observation is that, experienced photographers often are able to achieve different compositions by placing the dominant vanishing point at different image locations, and then choosing how the main structures of the scene are related to it in the captured image. In addition, while the difference in the dominant vanishing point locations can be simply computed as the Euclidean distance between them, our geometric segmentation result offers a natural representation of the arrangement of structures with respect to the dominant vanishing point. Therefore, given two images $I_i$ and $I_j$, let $P_i$ and $P_j$ be the locations of dominant vanishing points and $S_i$ and $S_j$ be the segmentation results generated by our method for these two images, respectively, we define the similarity measure as follows:

$$D(I_i, I_j) = F(S_i, S_j) + \alpha \|P_i - P_j\|, \quad (1)$$

where $F(S_i, S_j)$ is a metric to compare two segmentation maps. We adopt the Rand index [29] for its effectiveness. In addition, α controls the relative impact of the two terms in Eq. (1). We empirically set α=0.5.

Quantitive Evaluations

Image Segmentation

In this section, we compare the performance of our method with the state-of-the-art image segmentation method, gPb-owt-ucm [2]. For this experiment, we assume known dominant vanishing point locations. We emphasize that our goal here is not to compete with [2] as a generic image segmentation algorithm, but to demonstrate that information about the vanishing point (i.e., the geometric cue), if properly harnessed, can empower us to get better segmentation results.

To quantitatively evaluate the methods, we use three popular metrics to compare the result obtained by each algorithm with the manually-labeled segmentation: Rand index (RI), variation of information (VOI) and segmentation covering (SC). First, the RI metric measures the probability that an arbitrary pair of samples have the same label in two partitions. The range of RI metric is [0,1], higher values indicating greater similarity between two partitions. Second, the VOI metric measures the average condition entropy of two clustering results, which essentially measures the extent to which one clustering can explain the other. The VOI metric is non-negative, with lower values indicating greater similarity. Finally, the SC metric measures the overlap between the region pairs in two partitions. The range of SC metric is [0,1], higher values indicating greater similarity. We refer to [2] for more details about these metrics.

For this experiment, we manually labeled 200 images downloaded from the site flickr.com. These images cover a variety of indoor and outdoor scenes and each has a dominant vanishing point. During the labeling process, our focus is on identifying all the regions that differ from their neighbors either in their geometric structures or photometric properties. We show some images with the hand-labeled segmentation maps in FIGS. 7A-7D.

FIGS. 7A-7D also show the benchmark results of both methods. As one can see, our method significantly outperforms gPb-owt-ucm on all metrics. This is consistent with the example segmentation results we show in FIGS. 4 and 5, which clearly suggests that our method is advantageous in segmenting the geometric structures in the scene.

Evaluation on Vanishing Point Detection

Next, we compare our vanishing point detection method with two state-of-the-art methods proposed by Tardif [34] and Tretiak et al. [35], respectively. As we discussed earlier, both methods rely on the line segments to generate vanishing point candidates. Then, a non-iterative scheme similar to the popular RANSAC technique is developed in [34] to group the line segments into several clusters, each corresponding to one vanishing point. Using the vanishing points detected by [34] as an initialization, [35] further propose a non-linear optimization framework to jointly refine the extracted line segments and vanishing points.

In this experiment, we randomly picked 400 images from our database whose dominant vanishing points lie within the image frame. To make the comparison fair, for [34] and [35] we only keep the vanishing point with the largest support set among all hypotheses that also lie within the image frame. A detection is successful if the distance between the detected vanishing point and the manually labeled ground truth is smaller than 20 pixels. The success rates of all methods are shown in Table I, which suggest that our method is more accurate for detecting the dominant vanishing point in arbitrary images. We also note that while the joint optimization scheme proposed in [35] is effective in recovering weak line segments and vanishing points for urban scenes, its improvement over [34] is quite small in our case.

TABLE I

COMPARISON OF VANISHING POINT DETECTION ALGORITHMS

| Method | Tardif [34] | Tretiak et al. | Ours |
|---|---|---|---|
| Success Rate | 58.0% | 61.8% | 70.0% |

Photo Retrieval Experiments

Figure 8:
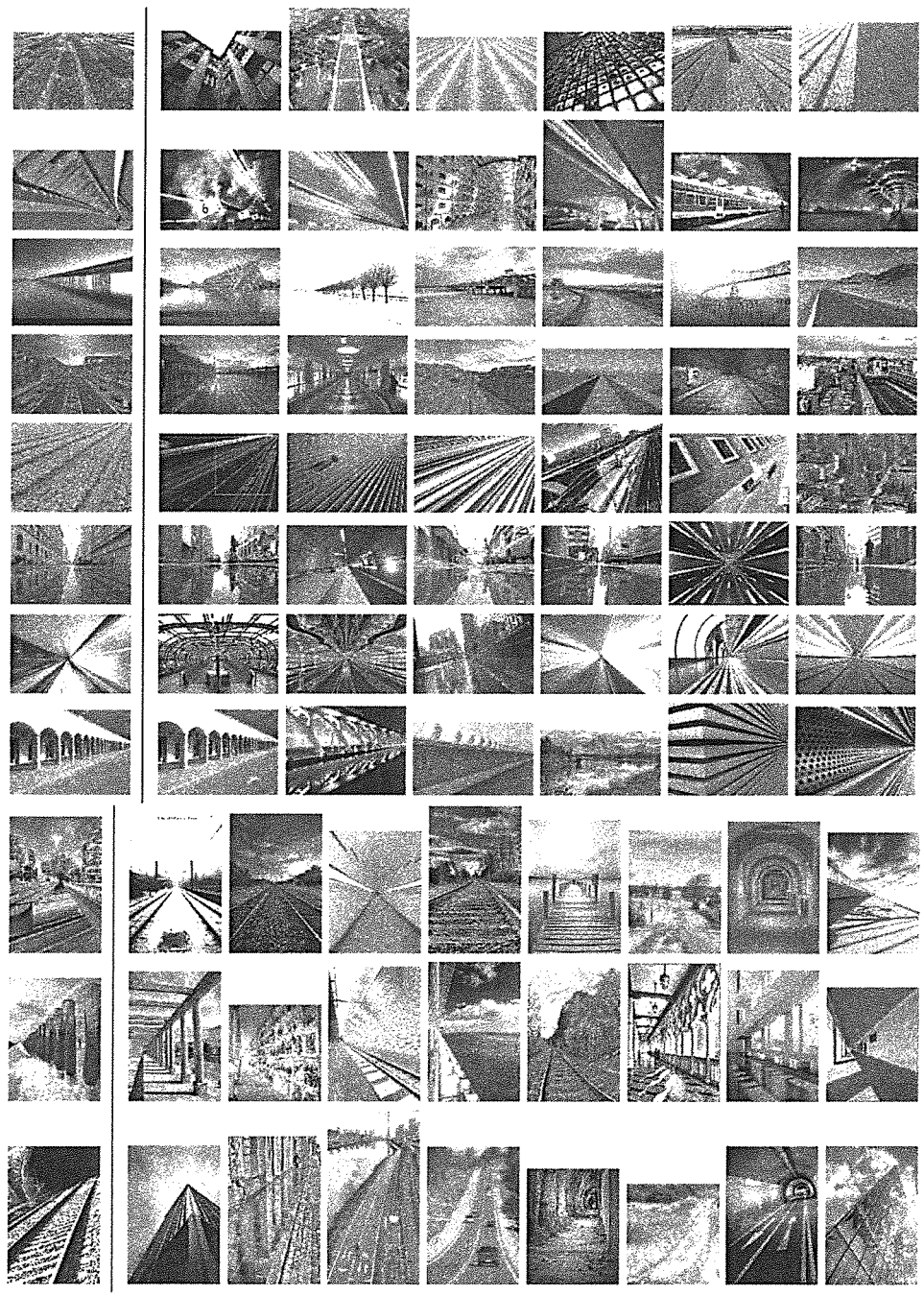
FIG. 8 gives composition-sensitive image retrieval results.

To validate the concept of composition-sensitive photo retrieval, we collected 3,728 images from flickr.com by querying the keyword "vanishing point". Each image in this database is scaled to size 500×330 or 330×500. To evaluate the effectiveness of our similarity measure (Eq. (1)), we manually label the dominant vanishing point and then apply our geometric image segmentation algorithm (with the distance measure $W(e_{ij})$ and the stopping criteria $\delta=0.55$) to obtain a segmentation for each image. The results (FIG. 8) clearly show that the measure is able to not only find images with similar dominant vanishing point locations, but also effectively capture how each region in the image is related to the vanishing point. For example, the images in the 4th, 6th, and 7th rows of FIG. 8 all have similar vanishing point locations (around the image center), but very different scene structure compositions, hence convey very different impressions to the viewer.

Besides providing on-site feedback to photographers, when having a large scale photo set to retrieve from is not critical, the method may also be used to retrieve images with similar composition in a very large scale image collection. Given a query image, we can first retrieve a set of candidate images through conventional methods, which provide an initial ranking. When composition is taken into consideration, images with similar composition as the query can be moved to the top of the ranking list.

Conclusions and Alternative Embodiments

We have shown a new method for modeling visual composition through analyzing the perspective effects and segmenting the image based on photometric and geometric cues. The method has been demonstrated for its effectiveness in detecting the dominant vanishing point from an arbitrary scene. Among a variety of potential applications, we have illustrated how our model can be used to build a composition-sensitive image retrieval system that is able to provide on-site feedback to photographers.

Our work may be used in alternative applications in several challenging directions. First, we may extend our geometric image segmentation and vanishing point detection algorithms to handle images with two or more dominant vanishing points, which can often be found in man-made environments. Here, our goal is to detect all the dominant vanishing points in an image and to group the regions according to the corresponding vanishing points. Another challenge in composition recognition for real-world photos is the presence of large foreground objects. They typically correspond to regions which do not associate with any vanishing point in the image. In addition, some photos may solely focus on the objects (e.g., a flower) and do not possess a well-defined perspective geometry. We will analyze the composition of these images by first separating the foreground objects from the background. Finally, besides providing on-site feedback to photographers, our method may also be used as a component in large-scale image retrieval engines. Our method may be used to select only images with a dominant vanishing point to prepare the database off-line for on-line composition-sensitive retrieval requests.

REFERENCES

[1] P. Arbelaez. Boundary extraction in natural images using ultrametric contour maps. In *POCV*, 2006.

[2] P. Arbelaez, M. Maire, C. Fowlkes, and J. Malik. Contour detection and hierarchical image segmentation. volume 33, pages 898-916, 2011.

[3] O. Barinova, V. Konushin, A. Yakubenko, K. Lee, H. Lim, and A. Konushin. Fast automatic single-view 3-D reconstruction of urban scenes. In *ECCV (2)*, pages 100-113, 2008.

[4] S. Bhattacharya, R. Sukthankar, and M. Shah. A framework for photo-quality assessment and enhancement based on visual aesthetics. In *ACM Multimedia*, pages 271-280, 2010.

[5] R. Datta, D. Joshi, J. Li, and J. Z. Wang. Studying aesthetics in photographic images using a computational approach. In *ECCV (3)*, pages 288-301, 2006.

[6] R. Datta, D. Joshi, J. Li, and J. Z. Wang. Image retrieval: Ideas, influences, and trends of the new age. *ACM Comput. Surv.*, 40(2), 2008.

[7] J. Deng, A. C. Berg, and F. Li. Hierarchical semantic indexing for large scale image retrieval. *In The 24th IEEE*

[8] S. Dhar, V. Ordonez, and T. L. Berg. High level describable attributes for predicting aesthetics and interestingness. In *CVPR*, pages 1657-1664, 2011.

[9] P. F. Felzenszwalb and D. P. Huttenlocher. Efficient graph-based image segmentation. *International Journal of Computer Vision,* 59(2): 167-181, 2004.

[10] S. Gould, R. Fulton, and D. Koller. Decomposing a scene into geometric and semantically consistent regions. In *ICCV*, pages 1-8, 2009.

[11] A. Gupta, A. A. Efros, and M. Hebert. Blocks world revisited: Image understanding using qualitative geometry and mechanics. In *ECCV* (4), pages 482-496, 2010.

[12] F. Han and S. C. Zhu. Bottom-up/top-down image parsing by attribute graph grammar. In *ICCV*, pages 1778-1785, 2005.

[13] V. Hedau, D. Hoiem, and D. A. Forsyth. Recovering the spatial layout of cluttered rooms. In *ICCV*, pages 1849-1856, 2009.

[14] V. Hedau, D. Hoiem, and D. A. Forsyth. Thinking inside the box: Using appearance models and context based on room geometry. In *ECCV* (6), pages 224-237, 2010.

[15] D. Hoiem, A. A. Efros, and M. Hebert. Automatic photo pop-up. *ACM Trans. Graph.*, 24(3):577-584, 2005.

[16] D. Hoiem, A. A. Efros, and M. Hebert. Recovering surface layout from an image. *International Journal of Computer Vision,* 75(1):151-172, 2007.

[17] H. Jegou, M. Douze, and C. Schmid. Improving bag-of-features for large scale image search. *International Journal of Computer Vision,* 87(3):316-336, 2010.

[18] H. Kong, J.-Y. Audibert, and J. Ponce. Vanishing point detection for road detection. In *CVPR*, pages 96-103, 2009.

[19] J. Kosecká and W. Zhang. Video compass. In *ECCV* (4), pages 476-490, 2002.

[20] D. C. Lee, M. Hebert, and T. Kanade. Geometric reasoning for single image structure recovery. In CVPR, pages 2136-2143, 2009.

[21] J. Li. Agglomerative connectivity constrained clustering for image segmentation. *Statistical Analysis and Data Mining,* 4(1):84-99, 2011.

[22] L. Liu, R. Chen, L. Wolf, and D. Cohen-Or. Optimizing photo composition. *Comput. Graph. Forum,* 29(2):469-478, 2010.

[23] Y. Luo and X. Tang. Photo and video quality evaluation: Focusing on the subject. In *ECCV* (3), pages 386-399, 2008.

[24] H. Mobahi, S. Rao, A. Y. Yang, S. S. Sastry, and Y. Ma. Segmentation of natural images by texture and boundary compression. *International Journal of Computer Vision,* 95(1):86-98, 2011.

[25] V. Nedovic, A. W. M. Smeulders, A. Redert, and J.-M. Geusebroek. Stages as models of scene geometry. *IEEE Trans. Pattern Anal. Mach. Intell.*, 32(9):1673-1687, 2010.

[26] P. Obrador, R. de Oliveira, and N. Oliver. Supporting personal photo storytelling for social albums. In *ACM Multimedia*, pages 561-570, 2010.

[27] P. Obrador, L. Schmidt-Hackenberg, and N. Oliver. The role of image composition in image aesthetics. In *ICIP*, pages 3185-3188, 2010.

[28] A. Oliva and A. Torralba. Modeling the shape of the scene: A holistic representation of the spatial envelope. *International Journal of Computer Vision,* 42(3): 145-175, 2001.

[29] W. M. Rand. Objective criteria for the evaluation of clustering methods. *Journal of the American Statistical Association,* 66(336):846-850, 1971.

[30] C. Rasmussen. Grouping dominant orientations for ill-structured road following. In *CVPR* (1), pages 470-477, 2004.

[31] B. C. Russell, A. A. Efros, J. Sivic, B. Freeman, and A. Zisserman. Segmenting scenes by matching image composites. In *NIPS*, pages 1580-1588, 2009.

[32] A. Saxena, M. Sun, and A. Y. Ng. Make3d: Learning 3d scene structure from a single still image. *IEEE Trans. Pattern Anal. Mach. Intell.*, 31(5):824-840, 2009.

[33] J. Shi and J. Malik. Normalized cuts and image segmentation. *IEEE Trans. Pattern Anal. Mach. Intell.*, 22(8):888-905, 2000.

[34] J.-P. Tardif. Non-iterative approach for fast and accurate vanishing point detection. In *ICCV*, pages 1250-1257, 2009.

[35] E. Tretiak, O. Barinova, P. Kohli, and V. S. Lempitsky. Geometric image parsing in man-made environments. *International Journal of Computer Vision,* 97(3):305-321, 2012.

[36] L. Yao, P. Suryanarayan, M. Qiao, J. Z. Wang, and J. Li. Oscar: On-site composition and aesthetics feedback through exemplars for photographers. *International Journal of Computer Vision,* 96(3):353-383, 2012.

[37] Y. Zhang, X. Sun, H. Yao, L. Qin, and Q. Huang. Aesthetic composition representation for portrait photographing recommendation. In *ICIP*, pages 2753-2756, 2012.

The invention claimed is:

1. A method of analyzing a photographic image, comprising the steps of:
receiving an image at a computer processor operative to perform the following steps:
determining a vanishing point in the image,
providing a segmentation which generates regions and boundaries between two of the adjacent regions, wherein a plurality of the regions is characterized by photometric cues and geometric cues, the geometric cues including the vanishing point,
weighting the photometric cues and geometric cues,
determining a weight for a boundary between two of the adjacent regions as a combination of the weighted photometric cues and weighted geometric cues between the two of the adjacent regions,
executing a hierarchical image segmentation process on the image to obtain an image segmentation map that partitions the image into photometrically and geometrically consistent regions based on the determined weight for the boundaries, and
modeling the composition of the image based upon the image segmentation map and the vanishing point.

2. The method of claim 1, including the steps of:
storing in a memory a plurality of images with image composition previously determined by using the model,
retrieving exemplar images from the plurality of images in the memory, the exemplar images having a similar composition to the image.

3. The method of claim 2, wherein the retrieving step uses a similarity measure to compare the composition of two images.

4. The method of claim 3, wherein the similarity measure is computed based on the image segmentation maps and the vanishing points of the images.

5. The method of claim 2, including the step of using the retrieved exemplar images to provide information to a user about the composition of the image.

6. The method of claim 1, wherein the hierarchical image segmentation process includes the steps of:
computing the weight at all of the boundaries,
merging two of the adjacent regions if the weight at the boundary between the two of the adjacent regions is smaller than a threshold, and
repeating the computing and merging steps until the desired number of regions is reached.

7. The method of claim 1, wherein the image segmentation map includes a plurality of segmented regions.

8. The method of claim 7, including the step of modeling each of the segmented regions as a flat surface or a plane.

9. The method of claim 8, including the step of modeling each of the segmented regions as a different plane.

10. The method of claim 1, wherein the step of determining a weight that the computer processer is operative to perform includes:
determining a weight for a boundary between two of the adjacent regions as a linear combination of the weighted photometric cues and weighted geometric cues between the two of the adjacent regions.

11. A method of analyzing a photographic image, comprising the steps of:
receiving an image at a computer processor operative to perform the following steps:
determining a vanishing point in the image,
providing a segmentation which generates regions and boundaries between two of the adjacent regions, wherein a plurality of the regions is characterized by photometric and geometric cues,
defining a weight for a boundary between two of the adjacent regions as a function of the photometric and geometric cues between the two of the adjacent regions,
executing a hierarchical image segmentation process on the image to obtain an image segmentation map that partitions the image into photometrically and geometrically consistent regions,
modeling the composition of the image based upon the image segmentation map and the vanishing point, and
wherein the step of defining a weight for a boundary between two of the adjacent regions includes using a geometric distance as the geometric cue and computing the geometric distance between two of the adjacent regions based on their relative locations with respect to the vanishing point in a polar coordinate system, with the vanishing point being the pole.

12. The method of claim 11, wherein the hierarchical image segmentation process includes the steps of:
computing the weight at all of the boundaries,
merging two of the adjacent regions if the weight at the boundary between the two of the adjacent regions is smaller than a threshold, and
repeating the computing and merging steps until the desired number of regions is reached.

13. The method of claim 11, wherein the image segmentation map includes a plurality of segmented regions.

14. The method of claim 13, including the step of modeling each of the segmented regions as a flat surface or a plane.

15. The method of claim 14, including the step of modeling each of the segmented regions as a different plane.

16. A method of analyzing a photographic image, comprising the steps of:
receiving an image at a computer processor operative to perform the following steps:
determining a vanishing point in the image,
providing a segmentation which generates regions and boundaries between two of the adjacent regions, wherein a plurality of the regions is characterized by photometric and geometric cues,
defining a weight for a boundary between two of the adjacent regions as a function of the photometric and geometric cues between the two of the adjacent regions,
executing a hierarchical image segmentation process on the image to obtain an image segmentation map that partitions the image into photometrically and geometrically consistent regions,
modeling the composition of the image based upon the image segmentation map and the vanishing point, and
wherein the step of determining a vanishing point in the image includes the steps of:
generating a grid mesh on the image,
assuming each of the vertexes on the grid as an assumed vanishing point,
aggregating the photometric and geometric cues over the entire image segmentation, and
determining one of the assumed vanishing points as the vanishing point based upon the cues.

17. The method of claim 16, wherein the photometric cue is a photometric distance between any two of the adjacent regions and the geometric cue is a geometric distance between any two of the adjacent regions, the geometric distance being computed based on the relative locations of the adjacent regions with respect to the assumed vanishing point in a polar coordinate system, with the assumed vanishing point being the pole.

18. The method of claim 17, wherein the step of aggregating the photometric and geometric cues over the entire image segmentation includes the step of calculating a consensus score as the sum of products of the photometric and geometric distances between all pairs of adjacent regions of the image segmentation.

19. The method of claim 16, wherein the step of determining a vanishing point in the image uses a coarse-to-fine procedure, the coarse-to-fine procedure including:
generating a finer grid mesh on the grid mesh adjacent to the determined vanishing point,
assuming each of the vertexes on the finer grid as an assumed vanishing point,
aggregating the photometric and geometric cues over the entire finer grid mesh, and
determining one of the assumed vanishing points as the vanishing point based upon the cues.

20. A system for analyzing a photographic image, comprising:
an input for receiving an image;
a computer processor operative to perform the following steps:
determining a vanishing point in the image,
providing a segmentation of the image which generates regions and boundaries between two of the adjacent regions, wherein each of the regions is characterized by photometric cues and geometric cues, the geometric cues including the vanishing point,
weighting the photometric cues and geometric cues,
determining a weight for a boundary between two of the adjacent regions as a combination of the weighted photometric cues and weighted geometric cues between the two of the adjacent regions, and executing a hierarchical image segmentation process on the image to obtain an image segmentation map that partitions the image into photometrically and geometrically consistent regions based on the determined weight for the boundaries; and an output for outputting image composition information based on the image segmentation map and the vanishing point.

21. The system for analyzing a photographic image according to claim 20, further comprising:

a memory for storing a plurality of images with image composition previously determined using the model.

22. The system for analyzing a photographic image according to claim 21, wherein the computer processor is further configured to perform:

retrieving exemplar images from the plurality of images in the memory, the exemplar images having a similar composition to the image and providing information to a user about the composition of the image.

23. The system for analyzing a photographic image according to claim 20, wherein the computer processer is operative to perform:

determining a weight for a boundary between two of the adjacent regions as a linear combination of the weighted photometric cues and weighted geometric cues between the two of the adjacent regions.

* * * * *